United States Patent [19]

Chen et al.

[11] 3,996,395
[45] Dec. 7, 1976

[54] METHOD OF INCREASING THE COERCIVITY OF MAGNETITE FILMS

[75] Inventors: Shih-Lu Chen; James A. Murphy, both of Painted Post, N.Y.

[73] Assignee: Corning Glass Works, Corning, N.Y.

[22] Filed: May 26, 1972

[21] Appl. No.: 257,336

[52] U.S. Cl. .............................. 427/129; 427/130
[51] Int. Cl.$^2$ ...................................... H01F 10/02
[58] Field of Search ............................. 117/234–240; 427/127–132, 47, 48

[56] References Cited

UNITED STATES PATENTS

| | | | |
|---|---|---|---|
| 2,919,207 | 12/1959 | Scholzel | 117/235 X |
| 3,031,338 | 4/1962 | Bourdeau | 117/107.2 X |
| 3,620,841 | 11/1971 | Comstock | 117/235 X |
| 3,634,137 | 1/1972 | Akashi et al. | 117/235 |
| 3,647,661 | 3/1972 | Matsushita | 117/235 X |
| 3,652,334 | 3/1972 | Abeck et al. | 117/235 X |
| 3,653,962 | 4/1972 | Akashi et al. | 117/235 X |
| 3,703,411 | 11/1972 | Melezoglu | 117/235 X |
| 3,795,542 | 3/1974 | Halaby | 117/49 |

*Primary Examiner*—Bernard D. Pianalto
*Attorney, Agent, or Firm*—Walter S. Zebrowski; Clarence R. Patty, Jr.

[57] ABSTRACT

A method of increasing the coercivity of a magnetic device having a magnetite film reduced from alpha ferric oxide. The alpha ferric oxide film is reduced to magnetite by subjecting it to a temperature greater than 400° C in a reducing atmosphere. The temperature of the film is then changed to between about 150° and 300° C, and the reducing atmosphere is replaced by an oxidizing atmosphere. The film is subjected to the oxidizing atmosphere while the temperature is held between 150° and 300° C, thus causing the magnetite film to become partially oxidized to form a solid solution of magnetite and gamma ferric oxide as represented by the formula, $(1-x)Fe_3O_4 \cdot xFe_2O_3$, where $x$ is between 0.49 and 0.85.

16 Claims, 4 Drawing Figures

METHOD OF INCREASING THE COERCIVITY OF MAGNETITE FILMS

BACKGROUND OF THE INVENTION

1. Field of the Invention

This invention relates to a method of increasing the coercivity of a magnetic device having a magnetite film reduced from alpha ferric oxide.

The coercivity of a magnetic material is one of the properties of the material which determine the strength of the magnetic field necessary to initialy magnetize or thereafter to cause a change in the direction of the magnetization of the material. It is also one of the parameters that determine the information density that can be recorded in and stored by the material. For example, digital information, each discrete amount of information being called a bit, is recorded on an area or region of a recording medium by magnetizing that region in a desired manner. This magnetized region will set up a magnetic field of its own which represents the recorded information. However, if the coercivity of a material is low and adjacent magnetized regions are too close, the magnetic field of one region will affect the magnetization of an adjacent region thereby causing incorrect information to be recorded. Therefore, there must be sufficient distance between two adjacent regions to avoid interaction between the magnetic field of each. The higher the coercivity of the material the less affect such a magnetic field will have on surrounding magnetic material and, therefore, the interaction between the magnetic fields of two adjacent magnetized regions representing two adjacent bits will be less. Consequently, with higher coercivity the recorded bits can be located closer to each other resulting in higher recorded information density. Magnetic films with high coercivity are especially useful in the fabrication of magnetic recording and storage devices used in data processing computers for storing digital information or in any other equipment where analog or digital information storage is desired.

2. Description of the Prior Art

Most presently available magnetic recording and storage devices comprising a magnetite or other all iron oxide film as the storage medium, have a coercivity value of about 200 to 300 Oe. (Oersteds). Some complicated and expensive laboratory methods of fabricating iron oxide maagnetic films have produced devices having a maximum coercivity value of around 400 Oe. Devices having a magnetic film made of cobalt have been produced which have coercivity values as high as 900 Oe. These cobalt films, however, are expensive and somewhat difficult to produce. Inability to economically and readily produce iron oxide film magnetic devices having coercivity values above 300 Oe., has resulted in the use of devices normally having a coercivity value somewhat less than 300 Oe. Consequently, the level of information storage per unit area of such commonly used devices is significantly less than desired.

SUMMARY OF THE INVENTION

It is, therefore, an object of this invention to provide a simple and economical method of substantially increasing the coercivity of a magnetite film formed by reducing a film of alpha ferric oxide, which method overcomes the heretofore noted disadvantages of the presently available low coercivity magnetite devices.

Briefly, according to the method of the present invention, an inorganic and non-magnetic support member or substrate is provided having a film of alpha ferric oxide formed on the surface thereof. The film-substrate combination is heated to a temperature of at last 400° C in a reducing atmosphere for a time sufficient to convert the alpha ferric oxide to magnetite. Thereafter, the temperature of the film is decreased, or increased if cooled after the conversion, and is maintained between about 150° and 300° C while the magnetite film is subjected to an oxidizing atmosphere for a time sufficient to partially oxidize the film and form a solid solution of magnetite and gamma ferric oxide represented by the formula $(1-x)Fe_3O_4 \cdot xFe_2O_3$, where $x$ has a value between 0.49 and 0.85.

Additional objects, features and advantages of the present invention will become apparent to those skilled in the art from the following detailed description and attached drawings, on which, by way of example, only the preferred embodiments of this invention are illustrated.

DETAILED DESCRIPTION

Figure 1:
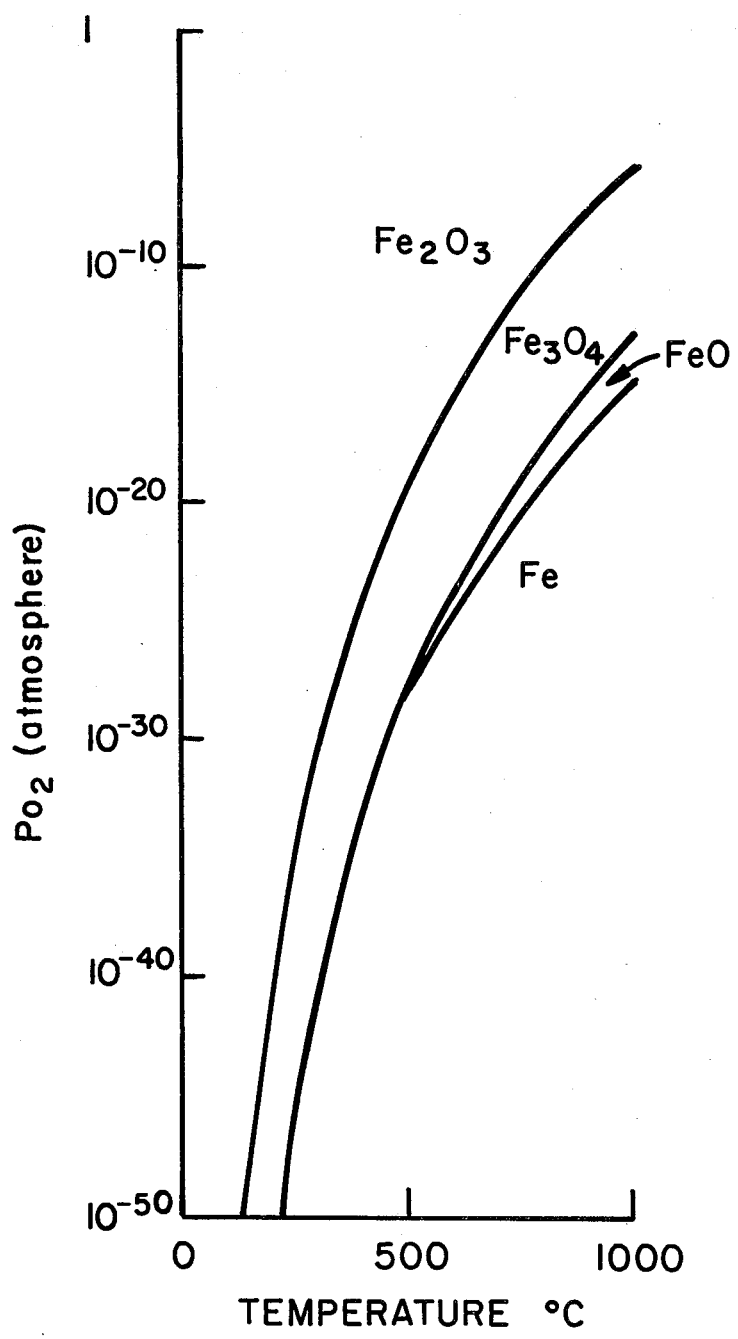
FIG. 1 is a phase diagram of the iron-oxygen system for Temperature vs. Oxygen Pressure.

A substrate or support member in the form of a disk, tape, rod, drum or wire is provided from any suitable inorganic and non-magnetic material, such as but not limited to anodized aluminum, glass, glass-ceramics or ceramics, that can withstand the high temperatures encountered in the method of the present invention without damage. An especially suitable substrate for the practice of this invention is formed of ion-exchange strengthened glass or glass-ceramic. There are several suitable ion-exchange processes well known in the art. A basic discussion of such processes may be found in a publication entitled "Stresses in Glass Produced by Non-Uniform Exchange of Monovalent Ions" by S. S. Kistler, published in the Journal of the Americal Ceramic Society, February 1962, pages 59–68.

A film of alpha ferric oxide is deposited on the substrate by any suitable process. The preferred method of forming the alpha ferric oxide film involves transporting vapors of an iron compound to a heated substrate where the vapors are allowed to react. The compound must be such that it will not decompose when vaporized. Suitable iron compounds include but are not limited to ferrocene, $Fe(C_5H_5)_2$ and iron pentacarbonyl, $Fe(CO)_5$. When ferrocene is used, the substrate is heated to a temperature between 450° and 500° C and is then subjected to the ferrocene vapors. Any suitable method known to one skilled in the art may be used to obtain and then convey the vapors to the heated substrate. Such methods include, but not be limited to, (1) heating a ferrocene powder charge above 150° C to vaporize the ferrocene, and then transporting the ferrocene vapors alone or with an inert or reducing carrier gas to the surface of the heated substrate; and (2) dissolving the ferrocene in benzene and then transporting the combination vapors of ferrocene and benzene alone or with an inert or reducing carrier gas to the surface of said substrate. By permitting oxygen to be present, the film deposited by such a process will be alpha ferric oxide.

The method of forming a film of alpha ferric oxide from iron pentacarbonyl vapors differs from that utilizing ferrocene vapors in that iron pentacarbonyl vaporizes at room temperature and the substrate temperature may be between 250° and 500° C.

According to another method, a film of alpha ferric oxide is formed on the desired substrate or support member by heating the substrate to a temperature between a minimum temperature of 250° C and a maximum temperature determined by either the physical limitations of the substrate or the decomposition temperature of alpha ferric oxide, whichever is lower. However, a temperature of about 450° to about 500° C is preferable for maximum efficiency. A surface of the heated substrate is then sprayed with a solution of soluble iron salts dissolved in a suitable organic solvent. The heat of the substrate causes a reaction of the solution such that an adherent coating or film of alpha ferric oxide is deposited on the heated substrate. Soluble iron salts especially suitable for this invention are ferric acetylacetonate and ferric hexafluoroacetylacetonate. Suitable organic solvents include, but are not limited to, benzene, benzene-methanol mixtures, and chlorinated hydrocarbons such as methylene chloride. The solution made from these compounds should be in the ratio of 0.1 gram to 0.4 gram of iron salt to each cubic centimeter of solvent.

Films of alpha ferric oxide can also be deposited directly on the desired substrate by methods including, but not limited to, radio frequency sputtering, reactive sputtering, and vacuum reactive evaporation.

The resulting film may be applied or formed to any desired thickness depending upon the future use of the magnetic storage device. An alpha ferric oxide film having a thickness between 2000 A and 4000 A is preferred for most present recording and storage applications. However, films having thicknesses between 500 A and 8000 A have been prepared and treated in accordance with the method of the present invention. Although the aforementioned methods of providing an alpha ferric oxide film bonded to a substrate are particularly suitable for use with the present invention, any other method of providing a suitable substrate and alpha ferric oxide film combination may be used.

The film of alpha ferric oxide is reduced to a film of magnetite by heating and maintaining the film and substrate combination at a temperature of between 400° C and the maximum temperature determined by structural limitations of the substrate while the substrate-film combination is disposed in a reducing atmosphere. Since the reduction process is usually very rapid at about 450° C, there is usually no reason for utilizing temperatures over 500° C.

An important consideration of the reducing atmosphere is the oxygen pressure of the atmosphere. FIG. 1 is a phase diagram that shows whether iron, Fe, or one of the iron-oxygen system phases, FeO, $Fe_2O_3$ or $Fe_3O_4$ will be stable at a particular temperature and oxygen pressure ($PO_2$). For example, if the magnetite phase is to be stable, the oxygen pressure must be between about $5 \times 10^{-41}$ atmosphere and $5 \times 10^{-31}$ atmosphere for a temperature of around 300° C, and between about $10^{-18}$ atmosphere and about $10^{-10}$ atmosphere for a temperature of around 800° C. Because of the very low oxygen pressure necessary at temperatures less than about 800° C, an atmosphere consisting essentially of free oxygen is, for practical reasons, inconvenient, if not impossible, to use. Therefore, to obtain an atmosphere having the necessary oxygen pressure at temperatures less than around 800° C, it is desirable to use an atmosphere having essentially no free oxygen, and consisting of at least one oxygen containing compound. Atmospheres particularly suitable for use with the present invention include but are not limited to a hydrogen and water ($H_2/H_2O$) mixture, a carbon monoxide and carbon dioxide ($CO/CO_2$) mixture, and a carbon monoxide and water ($CO/H_2O$) mixture. An inert gas, such as nitrogen, may be combined with these reduction atmospheres without significantly decreasing the effectiveness thereof. An atmosphere of $H_2$ and $H_2O$ in combination with $N_2$ is particularly suitable for use with the present method and may be obtained by bubbling a mixture of hydrogen and nitrogen through water. An important consideration for using this particular atmosphere is the hydrogen partial pressure to water partial pressure ratio ($PH_2PH_2O$). The nitrogen is substantially inert and acts only as a carrier gas for the water so that the ratio of hydrogen to water is more easily controlled. The allowable range of hydrogen partial pressure to water partial pressure ratio which will produce the necesssary oxygen pressure for converting an alpha ferric oxide film to magnetite will vary as the tempterature of the film and substrate combination varies.

Figure 2:
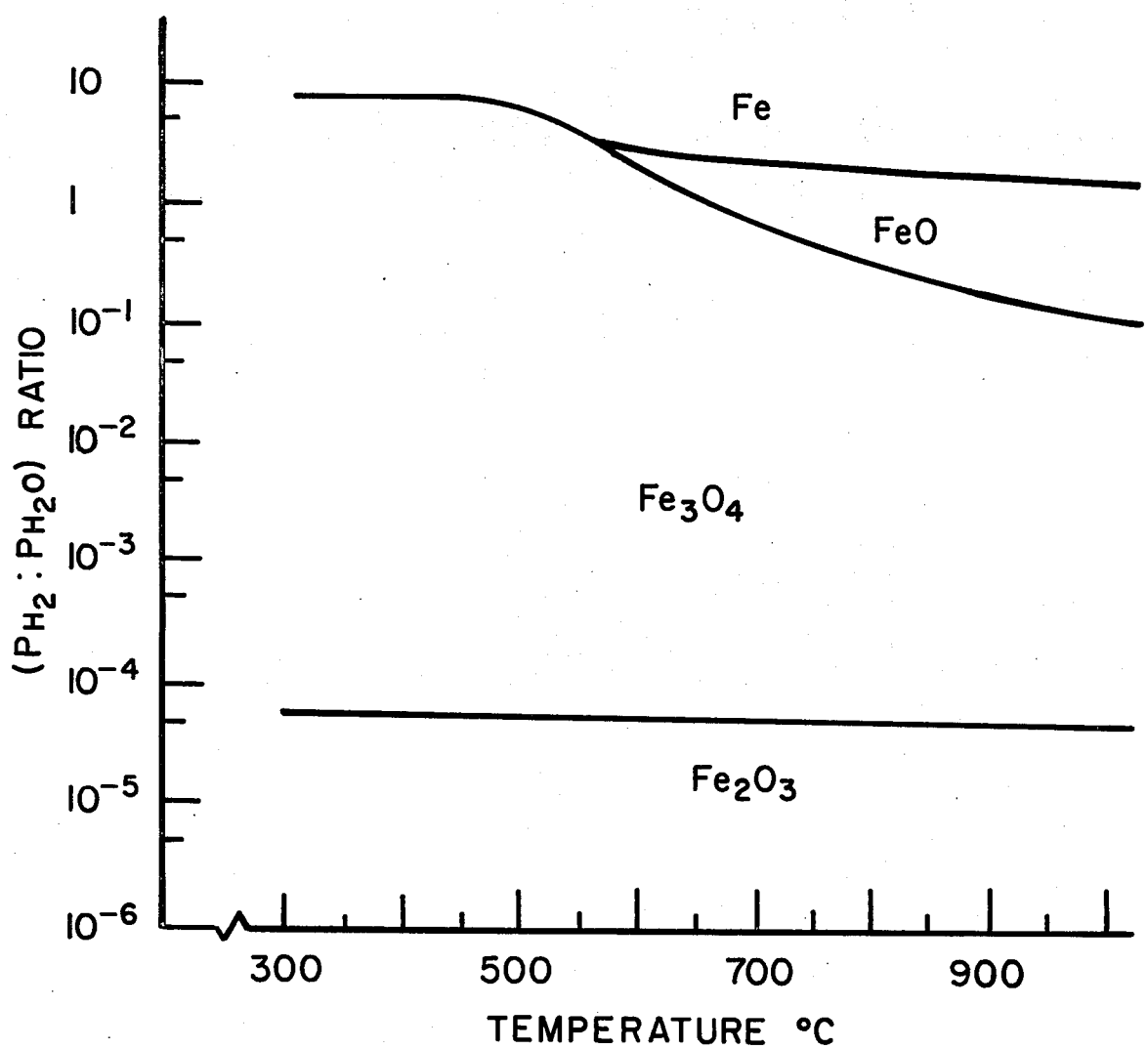
FIG. 2 is a phase diagram of the iron-oxygen system for Temperature vs. $PH_2:PH_2O$ (hydrogen partial pressure to water partial pressure ratio).

FIG. 2 is a phase diagram that shows whether iron, Fe, or one of the iron-oxygen system phases, FeO, $Fe_2O_3$ or $Fe_3O_4$, will be stable at a particular temperature and hydrogen partial presure to water partial pressure ratio. For example, the allowable range of hydrogen pressure to water partial pressure ratio, for a temperature of approximately 300° C, necessary to stabilize the iron-oxygen system in the magnetite phase is between approximately 8:1 and approximately $5 \times 10^{-5}:1$. That is, a hydrogen and water mixture having this range of hydrogen to water partial pressure ratios will have an oxygen pressure of between about $5 \times 10^{-41}$ and $5 \times 10^{-31}$ atmosphere. If a temperature of approximately 525° C is used, a partial pressure ratio range between approximately 5:1 and $5 \times 10^{-5}:1$ is necessary, however, for ease of control, a range of between 3:1 and $10^{-2}:1$ is preferable. More specifically, a particularly effective reduction atmosphere with a 2.4:1 ratio of hydrogen partial pressure to water partial pressure can be obtained by bubbling a mixture of 8% by volume of hydrogen and 92% by volume of nitrogen through water, while said hydrogen, nitrogen and water is maintained at approximately 25° C.

Figure 3:
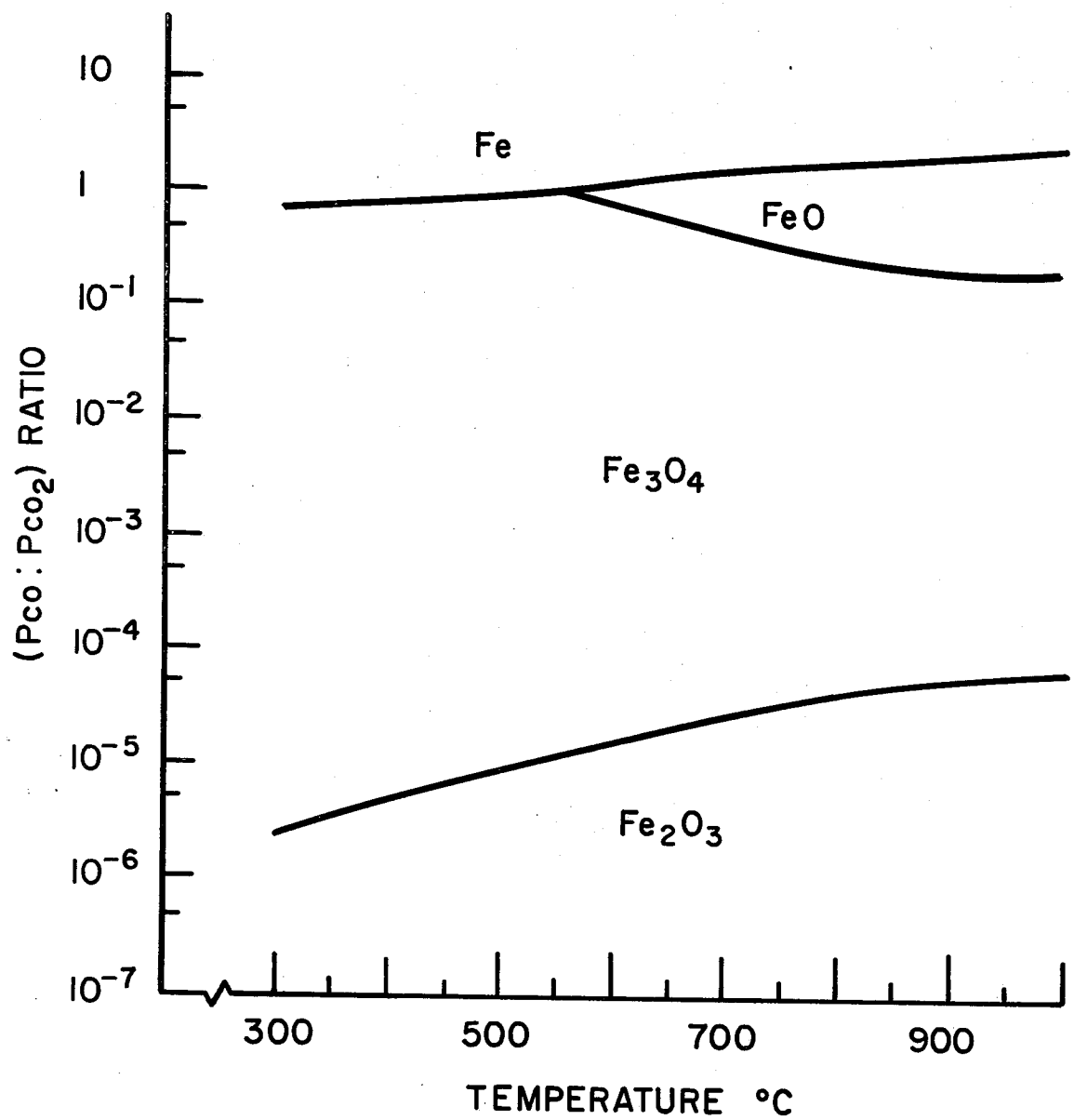
FIG. 3 is a phase diagram of the iron-oxygen system for Temperature vs. $PCO:PCO_2$ (carbon monoxide partial pressure to carbon dioxide partial pressure ratio).

Another effective reduction atmosphere for use with the present invention is a mixture of carbon monoxide, (CO), and carbon dioxide, ($CO_2$). Since both constituents of this mixture are gases, the correct proportions can easily be controlled within a suitable range by the use of simple instrumentation such as a flowmeter. The important consideration of this atmosphere is the carbon monoxide partial presure to carbon dioxide partial pressure ratio ($PCO-PCO_w$). FIG. 3 is a phase diagram that shows whether iron, Fe, or one of the ironoxygen system phases, FeO, $Fe_2O_3$ or $Fe_3O_4$ will be stable at a particular temperature and carbon monoxide partial pressure to carbon dioxide partial pressure ratio. For example, the allowable range of carbon monoxide partial pressure to carbon dioxide partial pressure ratios, for a temperature of approximately 300° C, necessary to stabilize the iron-oxygen system in the magnetite phase is between approximately $8 \times 0^{-1}:1$ and $3 \times 10^{-6}:1$. That is, a carbon monoxide and carbon dioxide mixture having this range of carbon monnoxide to carbon dioxide partial pressure ratios will have an oxygen pressure between about $5 \times 10^{-41}$ and $5 \times 10^{-31}$ atmosphere. If a temperature of approximately 525° C is used, a partial pressure ratio of between 1:1 and $10^{-5}:1$, is necessary, however, for ease of control, a range of between 1:1 and $10^{-2}:1$ is preferable.

It is to be noted, that the iron-oxygen phase diagrams of both FIG. 2 and FIG. 3, are discontinued at the low temperature of approximately 300° C, that FIG. 1 is discontinued at pressures less than $10^{-50}$ atmosphere, and that FIGS. 1, 2 and 3 are discontinued at a high temperature of approximately 1000° C. The diagrams are discontinued at the low temperatures since the conversion from an unstable phase to a stable phase is so slow at temperatures below about 300° C, with the exception of the conversion from magnetite to gamma ferric oxide, that all of the phases may be considered stable for a short period of time. The diagrams are discontinued at about 1000° C since, as will be further explained hereinafter, it is unlikely that for the purposes of this invention higher temperatures would be desired.

Although temperatures much higher than 600° C may be used in conjunction with a reduction atmosphere to convert an alpha ferric oxide film to magnetite, the use of temperatures higher than 600° C may result in a slight decrease in the coercivity of the magnetite as well as other minor deleterious effects to the magnetic qualities of the magnetite film. In order to reduce the alpha ferric oxide film at a reasonably fast rate and in order to avoid any deleterious effects due to excessively high temperatures, the reduction process is generally carried out at temperatures between 400° and 500° C, the preferred temperature range being between about 450° and 500° C. The rate of reduction of the film to magnetite is obviously dependent upon temperature, the speed of conversion increasing as temperature increases. All of the films processed were completely reduced in one half hour where the temperature was at least 500° C. A film having a thickness of a few thousand Angstroms can be reduced in a few minutes at temperatures of 500° C and above. It has been found that the conversion process can be optimized by insuring uniform heating of the material, and excluding any free oxygen.

After the alpha ferric oxide film has been converted to a film of magnetite, the temperature of the substrate-film combination is lowered to a temperature between about 300° C and 150° C, the preferred temperature range being between 225° C and 275° C. The reducing atmosphere is maintained in the reducing furnace until the temperature falls below 300° C. The reducing atmosphere is then purged from the furnace and is replaced by an oxidizing atmosphere such as air, a mixture of oxygen and an inert gas, or the like. An inert gas such as nitrogen may be used to purge the reducing atmosphere from the furnace before the oxidizing atmosphere is admitted, and this step is a necessity if hydrogen is present in the reducing atmosphere. This oxidation step is permitted to continue for a period of time between 15 minutes and three hours, depending upon film thickness and temperature. This process results in a partial oxidation of the magnetite film, and it forms a solid solution of magnetite and gamma ferric oxide which has a much higher coercivity than magnetite or gamma ferric oxide alone.

The coercivity was measured for a series of films that were subjected to various heat treatments after reduction, and the resultant data suggests a defect-vacancy phenomenon whereby an additional anisotropy is induced by preferential occupation of nonequivalent octahedral cites in the spinel lattice. Considering the solid solution of magnetite and gamma ferric oxide as a defect vacancy form of magnetite, the solid solution can be represented by the formula

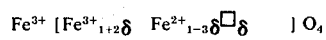

1.

where the symbol $\square_\delta$ represents a defect and $\delta$ is the defect content which is related to the mole fraction of gamma ferric oxide ($\alpha$-$Fe_2O_3$) in the solid solution represented by the formula $$(1-x)Fe_3O_4 \cdot xFe_2O_3, \qquad 2.$$

where $x$ is the mole fraction of gamma ferric oxide in solid solution with magnetite and is related to the defect content $\delta$ by the equation

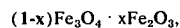

3.

Figure 4:
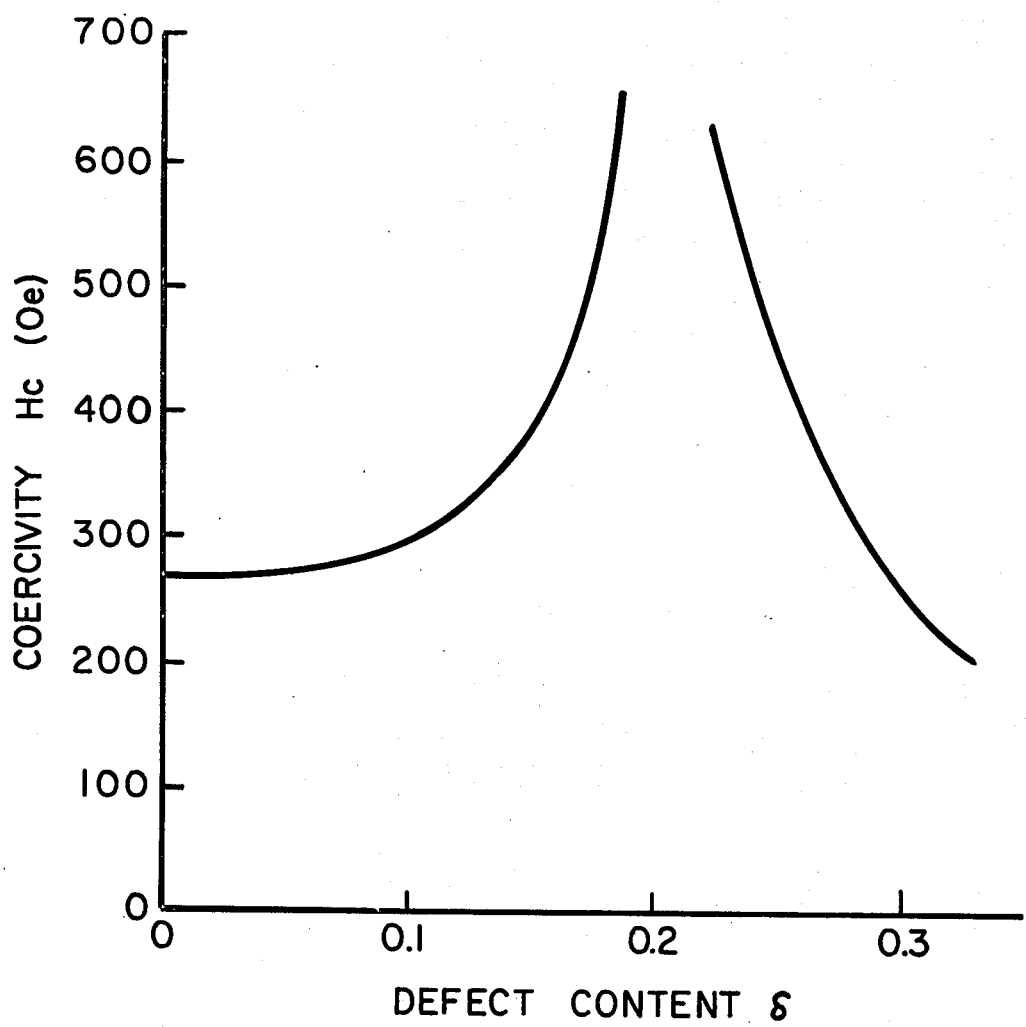
FIG. 4 is a graph illustrating the coercivity of magnetite films as a function of defect content $\delta$.

The ratio of $Fe^{3+}$ to $Fe^{2+}$ was measured by chemical analysis and values of defect content $\delta$ were obtained for a series of films. FIG. 4 shows the measured coercivity as a function of defect content for films having thicknesses between about 3000 A and 4000 A. The coercivity is slightly lower for thicker films. The fact that maximum coercivity occurs at $\delta \approx 0.18$ strongly suggests the $Fe^{2+} - \square$ active-site model, that is, if the induced anisotropy is proportional to the concentration of this type site then, at either end, low defect content or low $Fe^{2+}$ content, the induced anisotropy should approach zero. The maximum does indeed appear at roughly the maxmum of the product of the $Fe^{2+}$ concentration and the defect concenration, $\delta(1-3\delta)$. The observed time dependence of coercivity is further experimental evidence supporting a defect-vacancy explanation for the increase in coercivity. After the films were subjected to the aforementioned oxidizing heat treatment, the coercivities thereof gradually increased upon aging until maximum coercivities were achieved. After this aging process, which lasted between 3 and 4 weeks, the resultant coercivities were about 20–30% higher than those measured immediately following the oxidizing heat treatment. The coercivities plotted in FIG. 4 are those obtained after aging.

As shown in FIG. 4, the curve intersects the y-axis at a point representing about 275 Oe. As mentioned hereinabove the coercivity of a film is thickness dependent, and pure magnetite films usually exhibit coercivities between about 225 Oe and 275 Oe, depending upon film thickness. Since formula (1) reduces to $Fe_3O_4$ when $\delta$ equals zero, it can be seen that the intersection of the curve with the y-axis represents magnetite. From equation (3) it can be seen that $x$ is also zero at this point. If the oxidizing heat treatment were permitted to continue for a time sufficient to completely oxidize the magnetite film, $\delta$ would be 0.33 and formula (1) would reduce to $Fe_2O_3$, the fully oxidized film being gamma ferric oxide. This point on the curve represents a coercivity of about 200 Oe, which is that of gamma ferric oxide. Referring again to equation (3), it can be seen that the value of $x$ for $\alpha - Fe_2O_3$ is 1.0. The curve is discontinuous at values of $\delta$ between about 0.18 and 0.22 indicating an occurrence of scatter in this range. Some films having a $\delta$-value in this range had coercivities over 1000 Oe, and one film having a thickness of 3500 A had a coercivity of 1200 Oe after aging.

For a magnetic film to be suitable for use in magnetic recording devices, the coercivity thereof should be greater than about 350–400 Oe. Referring to FIG. 4 it is seen that films having values of $\delta$ between about 0.14 and 0.27 exhibit adequate coercivities for this purpose. From equation (3), the desired range of $x$ to provide coercivities greater than about 350 Oe is determined to be between about 0.49 and 0.85. The oxidizing heat treatment at a temperature between 150° C and 300° C should therefore be continued for a time sufficient to partially oxidize the magnetite film, thus forming a solid solution of magnetite and gamma ferric oxide as represented by formula (2) for values of $x$ between 0.49 and 0.85.

The above described process consistently increases the coercivity of a magnetite film by a factor of 2 to 3. The degree of coercivity increase of a device can be controlled by varying the temperature at which the combination device is subjected to the oxidizing atmosphere, the time during which the device is subjected to the oxidation atmosphere at an elevated temperature, and the type of oxidation atmosphere used. Since that portion of the curve in FIG. 4 corresponding to values of $\delta$ between 0.22 and 0.33 is very steep, it is difficult to stop the oxidation process to form a film having a desired coercivity and value of $\delta$ along this portion of the curve. A slight increase in oxidation of the film will quickly result in a film that is a solid solution almost entirely comprised of $\alpha$-$Fe_2O_3$. FIG. 4 clearly illustrates that the coercivities of such films are very low and can be even lower than the coercivity of the original magnetite film. It is therefore preferable to operate along that portion of the curve having values of $\delta$ between about 0.13 and 0.22 to obtain high coercivities.

To enable those skilled in the art to practice the method of the present invention, the following specific example is presented. An ion-exchange strengthened glass disk shaped substrate having a thickness of 0.08 inch, an outside diameter of 14 inches, and a center hole diameter of 6⅝ inches, is heated to approximately 450° while being subjected to vapors of ferrocene which are delivered to the substrate by nitrogen carrier gas. The ferrocene vapors are obtained by heating a ferrocene powder charge to about 150° C. The vapors are delivered to the substrate until a film of alpha ferric oxide is deposited thereon having a thickness of approximately 3500 A. The film of alpha ferric oxide is then converted to magnetite by subjecting said alpha ferric oxide film to a reduction atmosphere of $H_2$ and $H_2O$ mixed with $N_2$ at a temperature of 450° C for approximately ½ hour. A reducing atmosphere having a $H_2$ to $H_2O$ partial pressure ratio of 2.4:1 may be provided by bubbling a mixture of 8% hydrogen by volume and 92% nitrogen by volume through water, while said nitrogen, hydrogen and water is maintained at approximately 25° C. After such reduction, the temperature of the furnace is decreased to 250° C, and the furnace is purged with nitrogen to flush out the forming gas. Air is then admitted to the furnace for one half hour to cause a partial oxidation of the magnetite thereby forming a solid solution of magnetite and gamma ferric oxide. After the oxidizing heat treatment, the furnace is cooled to room temperature. The coercivity of the resultant film is about 480 Oe. immediately after it is formed, and it increases to about 600 Oe. after aging for 25 days.

Although the present invention has been described with respect to specific details of certain embodiments thereof, it is not intended that such details be limitations upon the scope of the invention except insofar as is set forth in the following claims.

We claim:
1. A method of processing magnetic films comprising the steps of
    providing an inorganic and non-magnetic substrate having a film of alpha ferric oxide formed on a surface thereof,
    heating said film-substrate combination to a temperature of at least 400° C in a reducing atmosphere for a time sufficient to convert said film of alpha ferric oxide to magnetite, thereafter
    maintaining said magnetite film at a temperature between 150° and 300° C, and
    subjecting said magnetite film to an oxidizing atmosphere while maintaining said temperature thereof between 150° and 300° C for a time sufficient to partially oxidize said magnetite film and form a solid continuous film of a solid solution of magnetite and gamma ferric oxide, said solid solution being represented by the formula $(1-x)Fe_3O_4 \cdot xFe_2O_3$, where $x$ has a value within the rang of 0.49 and 0.85.

2. The method of claim 1 wherein the step of subjecting said magnetite film to an oxidizing atmosphere is continued for a period of time between 15 minutes and 3 hours.

3. The method of claim 1 further comprising the step of aging the resultant film-substrate combination for at least 3 weeks.

4. The method of claim 1 wherein the thickness of said alpha ferric oxide film is between 500 A and 8000 A.

5. The method of claim 1 wherein the step of providing said substrate having a film of alpha ferric oxide comprises heating a substrate to a temperature of at least 250° C in an oxidizing atmosphere while exposing said substrate to iron compound vapors.

6. The method of claim 5 wherein said substrate is heated to a temperature between 250° C and 500° C while being exposed to iron pentacarbonyl vapors.

7. The method of claim 5 wherein said substrate is heated to a temperature between 450° C and 500° C while being exposed to ferrocene vapors.

8. The method of claim 1 wherein said substrate is formed of material selected from the group consisting of anodized aluminum, glass, glass-ceramic, and ceramic.

9. The method of claim 1 wherein the step of heating said film-substrate combination in a reducing atmosphere is performed at a temperature between 450° C and 500° C.

10. The method of claim 1 wherein the step of subjecting said magnetite film to an oxidizing atmosphere is performed at a temperature between 225° C and 275° C.

11. The method of claim 1 wherein the step of heating said film-substrate combination in a reducing atmosphere comprises subjecting said film-substrate combination to an atmosphere selected from the group consisting of hydrogen and water, carbon monoxide and water, and carbon monoxide and carbon dioxide.

12. The method of claim 1 wherein the step of providing said substrate having a film of alpha ferric oxide comprises heating a substrate to a temperature between 250° and 500° C and exposing said substrate to vapors of a compound selected from the group consisting of ferrocene, iron pentacarbonyl, ferric chloride, ferric acetylacetonate, and ferric hexafluoroacetylacetonate.

13. The method of claim 1 wherein said substrate is an ion-exchange strengthened material selected from the group consisting of glass and glass-ceramic.

14. A method of making a magnetic recording and storage device comprising the steps of
providing a disk formed from an inorganic and non-magnetic ion-exchange strengthened material selected from the group consisting of glass and glass-ceramic,
heating said disk to a temperature between 450° and 500° C in an oxygen-containing atmosphere,
exposing said heated disk to ferrocene vapors in said oxygen-containing atmosphere to deposit on said disk a film of alpha ferric oxide having a thickness between 2000 Å and 4000 Å,
heating said alpha ferric oxide film to a temperature of at least 400° C in a reducing atmosphere for a time sufficient to convert said film of alpha ferric oxide to magnetite, thereafter
maintaning said magnetite film at a temperature between 150° and 300° C, and
subjecting said magnetite film to an oxidizing atmosphere while maintaining said temperature thereof between 150° and 300° C for a time sufficient to partially oxidize said magnetite film and form a solid continuous film of a solid solution of magnetite and gamma ferric oxide, said solid solution being represented by the formula $(1'x)Fe_3O_4 \cdot xFe_2O_3$, where $x$ has a value within the range of 0.49 and 0.85.

15. The method in accordance with claim 14 wherein the step of subjecting said magnetite film to an oxidizing atmosphere is performed while said magnetite film is maintained at a temperature between 225° and 275° C.

16. The method of claim 15 wherein the step of exposing said heated disk to ferrocene vapors comprises vaporizing a quantity of ferrocene powder by heating said powder to a temperature above 150° C and thereafter directing the resultant vapors to said heated disk.

* * * * *